United States Patent
N'guessan et al.

(10) Patent No.: US 12,439,124 B2
(45) Date of Patent: Oct. 7, 2025

(54) METHODS, SYSTEMS, AND MEDIA FOR PRESENTING RECOMMENDED MEDIA CONTENT ITEMS BASED ON USER NAVIGATION SIGNAL

(71) Applicant: Google LLC, Mountain View, CA (US)

(72) Inventors: Sylvia N'guessan, San Francisco, CA (US); Benjamin Lipshitz, Berkeley, CA (US)

(73) Assignee: Google LLC, Mountain View, CA (US)

( * ) Notice: Subject to any disclaimer, the term of this patent is extended or adjusted under 35 U.S.C. 154(b) by 257 days.

(21) Appl. No.: 17/976,197

(22) Filed: Oct. 28, 2022

(65) Prior Publication Data

US 2024/0147008 A1 May 2, 2024

(51) Int. Cl.
*H04N 21/466* (2011.01)
*H04N 21/482* (2011.01)

(52) U.S. Cl.
CPC ..... *H04N 21/4668* (2013.01); *H04N 21/4826* (2013.01)

(58) Field of Classification Search
CPC ............... H04N 21/4826; H04N 21/4668
USPC ........................................ 725/61
See application file for complete search history.

(56) References Cited

U.S. PATENT DOCUMENTS

| | | |
|---|---|---|
| 2007/0157237 A1 | 7/2007 | Cordray et al. |
| 2012/0257108 A1 | 10/2012 | Friedlander et al. |
| 2013/0290110 A1 * | 10/2013 | LuVogt ............... G06F 16/9535 705/14.66 |
| 2017/0013297 A1 * | 1/2017 | Wei .................. H04N 21/44226 |
| 2019/0171753 A1 * | 6/2019 | Teng .................... G06F 16/285 |
| 2020/0021872 A1 | 1/2020 | Venkatraman et al. |
| 2020/0296467 A1 | 9/2020 | Bagga et al. |

* cited by examiner

*Primary Examiner* — Alfonso Castro
(74) *Attorney, Agent, or Firm* — Shumaker & Sieffert, P.A.

(57) ABSTRACT

Methods, systems, and media for presenting recommended media content items based on user navigation signals are provided. In some embodiments, the method includes: receiving an update to a display area within a user interface having a first plurality of media content items queued for display, wherein the update comprises a second plurality of media content items; determining a presentation order for the second plurality of media content items, wherein adjacent media content items in the presentation order have a similarity score within a range of similarity values; causing at least one media content item in the first plurality of media content items to be presented in the display area; determining a user engagement signal based on a plurality of user navigation actions from the display area of the user interface; replacing a first media content item from the first plurality of media content items queued for display with a second media content item from the second plurality of media content items, wherein the first media content item is selected based on the user engagement signal; and causing the second media content item to be presented in the display area.

21 Claims, 6 Drawing Sheets

METHODS, SYSTEMS, AND MEDIA FOR PRESENTING RECOMMENDED MEDIA CONTENT ITEMS BASED ON USER NAVIGATION SIGNAL

TECHNICAL FIELD

The disclosed subject matter relates to methods, systems, and media for presenting recommended media content items based on user navigation signals.

BACKGROUND

Many users stream videos, music, social media updates, and movies from a variety of platforms, and each platform typically uses a recommendation system to populate a user interface with media content for the user to explore. Often, the recommendation system can provide the user interface with new content as the user navigates the user interfaces of the platform. This can be accomplished when the user interface requests additional content (e.g., from a server associated with the user interface) after the user scrolls through a certain amount of the user interface, thereby giving the user the illusion that there is always more content to see.

In order to provide users with an enjoyable experience, each update needs to include content that reflects the user's preferences. Recommendation systems can take in many user signals and can often succeed at recommending enjoyable content. However, when the user interface adds the additional recommended content to the end of the content list, the user must often scroll through content that is outdated compared to what the recommendation system included in the most recent update.

Accordingly, it is desirable to provide new mechanisms for presenting recommended media content items based on user navigation signals.

SUMMARY

Methods, systems, and media for presenting recommended media content items based on user navigation signals are provided.

In accordance with some embodiments of the disclosed subject matter, a method for presenting recommended media content items is provided, the method comprising: receiving an update to a display area within a user interface having a first plurality of media content items queued for display, wherein the update comprises a second plurality of media content items; determining a presentation order for the second plurality of media content items, wherein adjacent media content items in the presentation order have a similarity score within a range of similarity values; causing at least one media content item in the first plurality of media content items to be presented in the display area; determining a user engagement signal based on a plurality of user navigation actions from the display area of the user interface; replacing a first media content item from the first plurality of media content items queued for display with a second media content item from the second plurality of media content items, wherein the first media content item is selected based on the user engagement signal; and causing the second media content item to be presented in the display area.

In some embodiments, determining the presentation order for the second plurality of media content items further comprises determining, using a cosine similarity calculation, a similarity score between each pair of media content items in the second plurality of media content items.

In some embodiments, determining the presentation order for the second plurality of media content items further comprises determining a potential user engagement value for each media content item in the second plurality of media content items.

In some embodiments, the user engagement signal based on the plurality of user navigation actions from the display area of the user interface comprises the user browsing media content items previously displayed in the display area by navigating the display area.

In some embodiments, the user engagement signal based on the plurality of user navigation actions from the display area of the user interface comprises the user browsing media content items from the first plurality of media content items queued for display.

In some embodiments, the user engagement signal comprises a positive indication of user interaction with a particular media content item, and wherein the first media content item is selected based on determining that the particular media content item and the first media content item have a similarity below a threshold value.

In some embodiments, the user engagement signal comprises a negative indication of user interaction with a particular media content item, and wherein the first media content item is selected based on determining that the particular media content item and the first media content item have a similarity score above a threshold value.

In accordance with some embodiments of the disclosed subject matter, a system for presenting recommended media content items is provided, the system comprising a memory and a hardware processor that is configured to: receive an update to a display area within a user interface having a first plurality of media content items queued for display, wherein the update comprises a second plurality of media content items; determine a presentation order for the second plurality of media content items, wherein adjacent media content items in the presentation order have a similarity score within a range of similarity values; cause at least one media content item in the first plurality of media content items to be presented in the display area; determine a user engagement signal based on a plurality of user navigation actions from the display area of the user interface; replace a first media content item from the first plurality of media content items queued for display with a second media content item from the second plurality of media content items, wherein the first media content item is selected based on the user engagement signal; and cause the second media content item to be presented in the display area.

In accordance with some embodiments of the disclosed subject matter, a non-transitory computer-readable medium containing computer executable instructions that, when executed by a processor, cause the processor to execute a method for presenting recommended media content items is provided, the method comprising: receiving an update to a display area within a user interface having a first plurality of media content items queued for display, wherein the update comprises a second plurality of media content items; determining a presentation order for the second plurality of media content items, wherein adjacent media content items in the presentation order have a similarity score within a range of similarity values; causing at least one media content item in the first plurality of media content items to be presented in the display area; determining a user engagement signal based on a plurality of user navigation actions from the display area of the user interface; replacing a first media content item from the first plurality of media content items queued for display with a second media content item from the second plurality of media content items, wherein the first media content item is selected based on the user engagement signal; and causing the second media content item to be presented in the display area.

In accordance with some embodiments of the disclosed subject matter, a system for presenting recommended media content items is provided, the system comprising: means for receiving an update to a display area within a user interface having a first plurality of media content items queued for display, wherein the update comprises a second plurality of media content items; means for determining a presentation order for the second plurality of media content items, wherein adjacent media content items in the presentation order have a similarity score within a range of similarity values; means for causing at least one media content item in the first plurality of media content items to be presented in the display area; means for determining a user engagement signal based on a plurality of user navigation actions from the display area of the user interface; means for replacing a first media content item from the first plurality of media content items queued for display with a second media content item from the second plurality of media content items, wherein the first media content item is selected based on the user engagement signal; and means for causing the second media content item to be presented in the display area.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
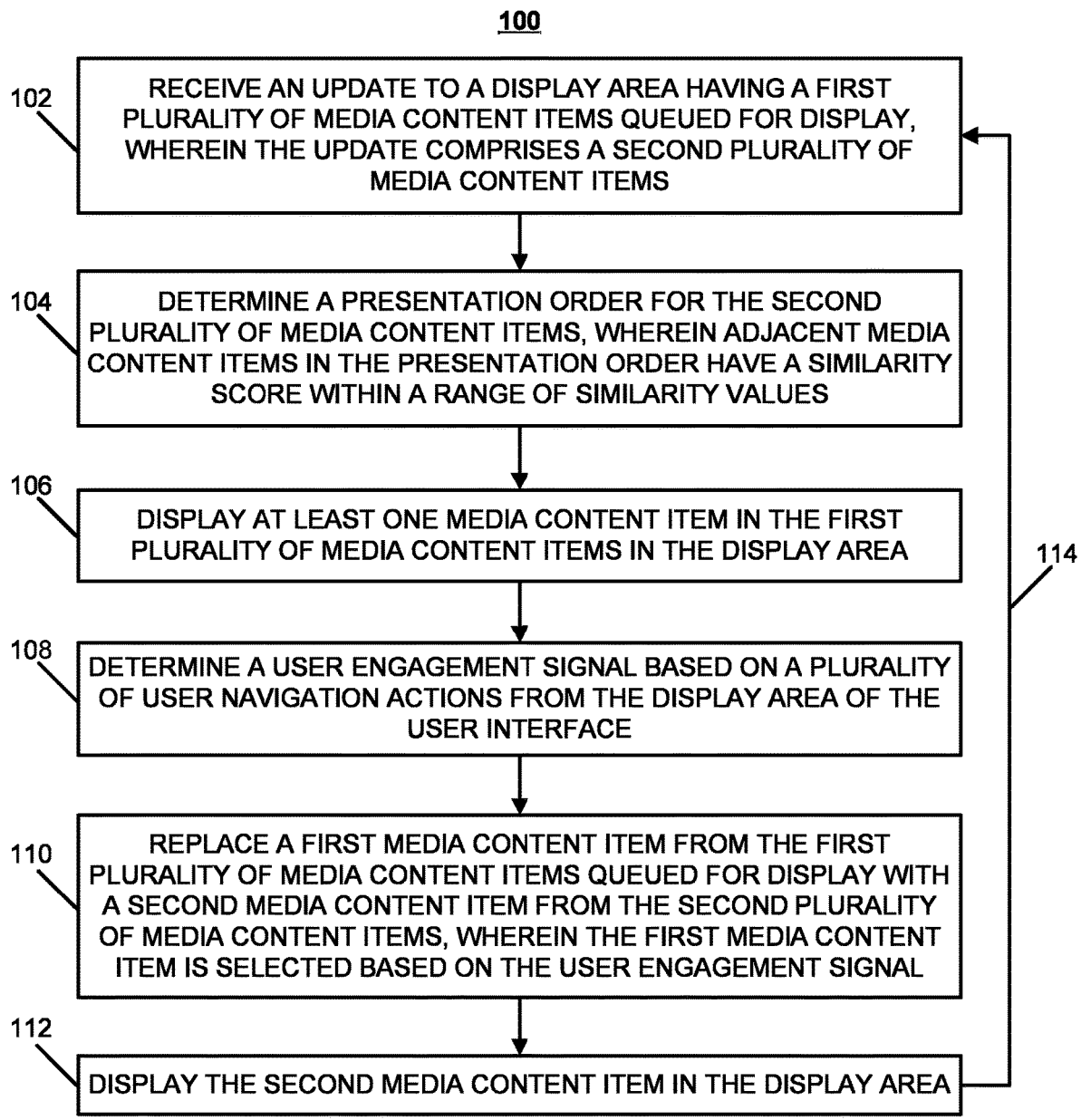
FIG. 1 shows an example flow diagram of an illustrative process for presenting recommended media content items based on user navigation signals in accordance with some embodiments of the disclosed subject matter.

In accordance with various embodiments of the disclosed subject matter, mechanisms (which can include methods, systems, and media) for presenting recommended media content items based on user navigation signals are provided.

Generally speaking, the mechanisms described herein relate to the presentation of media content received in an update to a user interface, where the update contains additional media content that can be displayed in the user interface. The mechanisms can, in some embodiments, replace unseen media content in the user interface with media content included in the update. In some embodiments, the mechanisms can receive user engagement signals and can determine the similarity of media content that received engagement with media content that was received in the update and/or with media content that is queued for display. In some embodiments, the mechanisms can determine that a previously queued, but unviewed media content item is similar to a second media content item that received a "dislike" sentiment or any other suitable negative sentiment, and the mechanisms can replace the similar media content item with a third media content item from the update to the user interface.

For example, consider a user that is scrolling through videos in a streaming application that uses a video feed to provide available content to the user. Continuing this example, when the user dislikes a video from the video feed which happens to be a soccer-related video, the next update to the video feed (which can include new content) can reflect this information, where the recommendation system included with the streaming application can send content to the user's device that includes comedy sketches and other types of sports (e.g., tennis). However, it is often the case that an update to a video feed happens while there are still additional items from a previous update that are yet to be presented. That is, in continuing the above example, there can be multiple soccer-related videos in the video feed and the user can provide a dislike sentiment or any other suitable negative sentiment towards the first soccer-related video that is presented in the content feed. Then, the streaming application can determine, based on the user navigation, that a second soccer video is approaching the top of the video feed where that video will be displayed. Continuing this example, the mechanisms can identify the second soccer video as a candidate to be replaced with a different video from the new content received in an update. That is, the mechanisms can replace the second soccer video with the tennis video before the display of the second soccer video, and the comedy sketches can be appended to the end of the video feed. This replacement of the second soccer video with another video can be performed based on the user engagement with videos in the video container, based on navigation speed (e.g., how fast the user is navigating through videos in the video container), and/or based on navigation direction (e.g., which direction the user is navigating through videos in the video container). In this way, in some embodiments, the mechanisms can keep the video feed up to date with the user's preferences and recent engagement with the video container.

These and other features for presenting recommended media content items based on user navigation signals are further described in connection with FIGS. 1-5.

Turning to FIG. 1, an example flow diagram of an illustrative process 100 for presenting recommended media content items based on user navigation signals in accordance with some embodiments of the disclosed subject matter is shown. In some embodiments, process 100 can run on a server such as server 402 and/or a user device such as user devices 406, described below in connection with FIG. 4. In some embodiments, process 100 can make use of communication networks, such as communication network 404.

In some embodiments, process 100 can begin at 102 when a user interface receives an update to a media content display area, such as media container 220 and/or video container 300 as described below in connection with FIGS. 2 and 3A-3D, respectively. In some embodiments, process 100 can receive any suitable number of media content items from a server associated with a program and/or application associated with the user interface. In some embodiments, process 100 can receive an update based on a request sent by the user interface and/or any suitable component of the user interface, such as the media content display area. In some embodiments, process 100 can add media content items received in an update to any suitable number of media content items already present in the user interface. In some embodiments, the user interface which receives the update can have a display area for the media content items.

In some embodiments, process 100 can continue at 104 when process 100 determines a presentation order for any suitable number of the media content items. For example, in some embodiments, at 104, process 100 can determine a presentation order for only the media content items received at 102. In another example, in some embodiments, process 100 can determine a presentation order for unseen media content items that are queued for display in the user interface. In some embodiments, process 100 can use any suitable mechanism to determine a presentation order at 104. For example, in some embodiments, process 100 can rank the media content items according to any suitable criteria, such as a prediction of user engagement with each media content item in the ranking. In another example, in some embodiments, process 100 can include any suitable user engagement signals from the user interface (either in the current session and/or aggregated over many prior sessions) to determine media content items that the user is likely to engage with in a positive manner, and can rank those media content items higher in the presentation order than other media content items.

In some embodiments, process 100 can continue at 106 when process 100 displays at least one media content item in the display area. In some embodiments, process 100 can display media content items that were queued for display prior to the update received at 102. In some embodiments, process 100 can display media content items that were received in the update at 102. In some embodiments, process 100 can display a media content item that was previously displayed, for example, by a user navigating backwards through a user interface. In some embodiments, process 100 can display a combination of media content items, such as a playlist.

In some embodiments, process 100 can continue at 108 when process 100 receives a user engagement signal based on a plurality of user navigation actions from the display area of the user interface. In some embodiments, a user can scroll through several displays of media content items in an advancing fashion, that is, causing the display to continue displaying additional media content items from the queued items. In some embodiments, a user can scroll through displays of media content items in a decreasing fashion, that is, causing the display to re-display media content items that the user has already viewed. In some embodiments, process 100 can additionally determine the speed at which the user is navigating the display of media content items in the user interface.

Additionally, in some embodiments, at 108 process 100 can determine a user engagement signal. In some embodiments, a user can directly engage with the user interface, such as selecting an on-screen button and/or menu selection indicating a positive, negative, and/or any other suitable type of reaction to the media content item(s) displayed. For example, in some embodiments, a user can select a button that indicates the user enjoys and/or does not enjoy the displayed content (e.g., a "like" button and/or a "dislike" button). In another example, in some embodiments, a user can view a portion of the media content item, for example, if the media content item has video and/or audio data, the user can begin playback of the media content item. Continuing this example, in some embodiments, process 100 can calculate how long the user views the media content item and can consider a positive and/or negative user engagement signal based on the view time. In some embodiments, a user engagement signal can be any suitable type of indication with the display area of the user interface. In some embodiments, a user can engage with the user interface at any suitable time, and, at 108, process 100 can collect the indication of the user engagement as the user engagement signal.

In some embodiments, process 100 can continue at 110 when process 100 replaces a first media content item from the items not yet displayed in the user interface with a second media content item from the set of items received in the update at 102. For example, in some embodiments, at 102, the user interface can have five media content items queued for display, and the user interface can receive another seven media content items. In this example, the user interface can display the first three media content items from the queue of five items, and can replace the remaining two queued items with media content items from the seven items received at 102. In some embodiments, process 110 can use any suitable information to determine which media content item(s) to remove from the queue and which media content item(s) (e.g., from the update) to include in the queue. For example, in some embodiments, process 100 can use the user navigation and user engagement signal discussed above at block 108. In another example, as described below in connection with FIGS. 3A-3D, process 100 can remove items with a negative use engagement signal.

In some embodiments, process 100 can continue at 112 when process 100 displays the second media content item that process 100 placed into the queue for display at block 110. For example, process 100 can display the second media content item based on further user navigation in the display area of the user interface.

In some embodiments, process 100 can loop at 114 when process 100 receives another quantity of media items in an update from the server. For example, in some embodiments, a user can scroll through the entirety of the media content items queued for display and the user interface can request additional media content items to re-populate the display with additional content for the user to view. In this example, in some embodiments, process 100 can be executed with the next round of media content items received in the update.

In some embodiments, process 100 can end at any suitable time.

Figure 2:
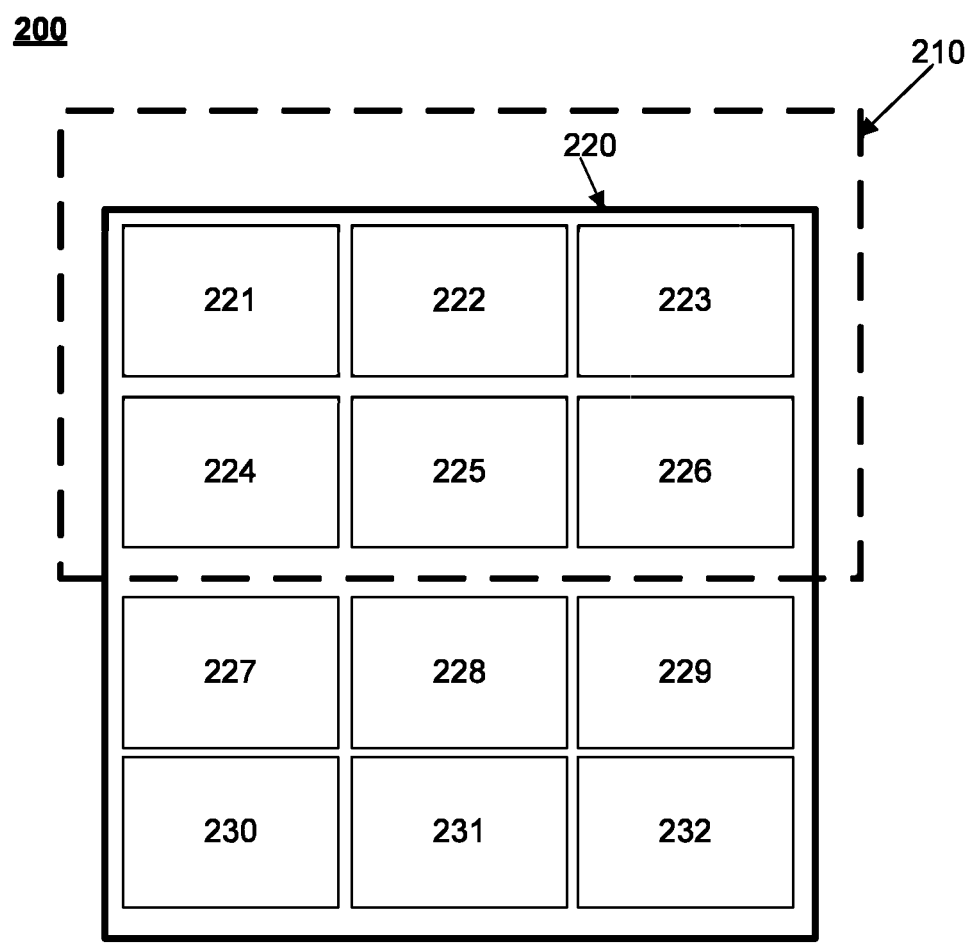
FIG. 2 shows an example illustration of a media content display area with multiple regions in accordance with some embodiments of the disclosed subject matter.

Turning to FIG. 2, an example illustration of a user interface 200 with a media container that has multiple regions in accordance with some embodiments of the disclosed subject matter is shown. As shown, user interface 200 includes display 210 and media container 220.

In some embodiments, user interface 200 can be associated with any suitable program and/or application. For example, in some embodiments, user interface 200 can be a graphical user interface (GUI) for any suitable media application such as a photo viewing and/or editing application; an audio application that can play audio files while also displaying artist, song, and/or album information; a video streaming application that is connected to a content delivery network and/or streaming service, etc.

Figure 5:
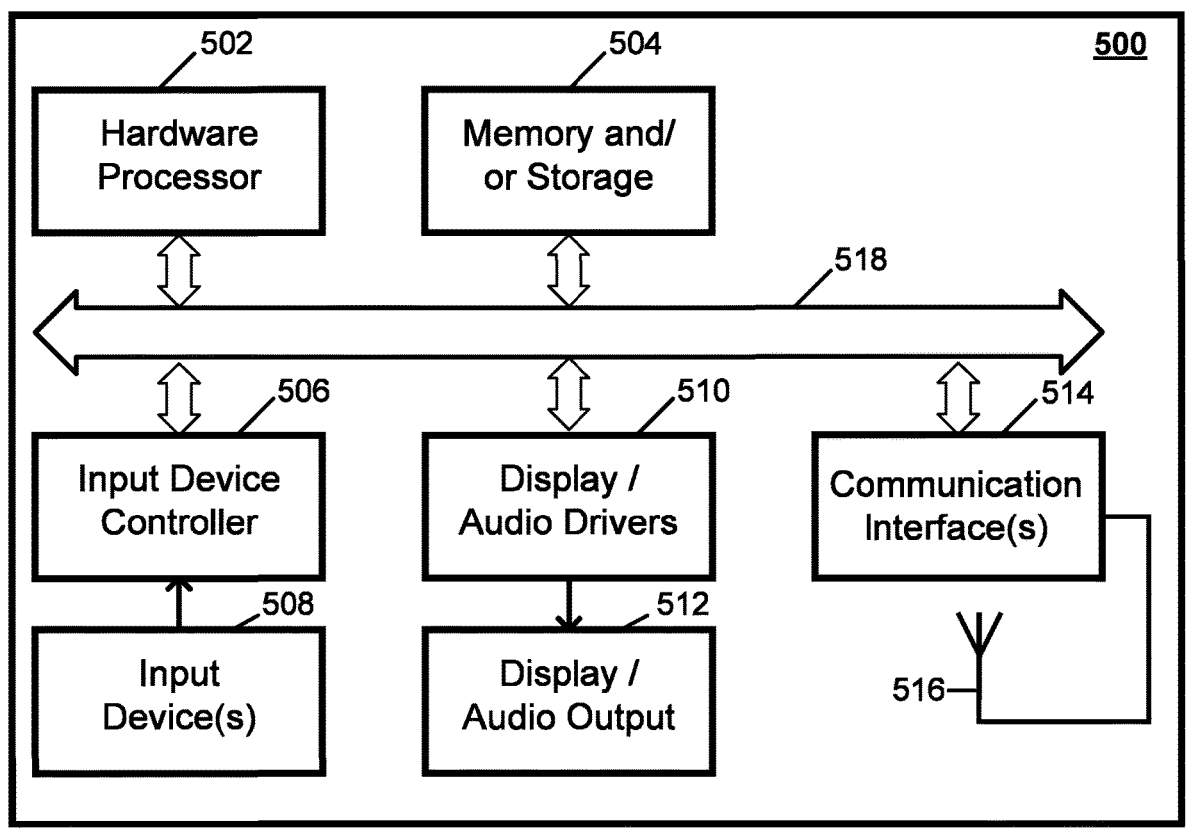
FIG. 5 shows an example block diagram of hardware that can be used in a server and/or a user device of FIG. 4 in accordance with some implementations of the disclosed subject matter.

In some embodiments, display 210 can be any suitable display device, such as display devices 512 as discussed below in connection with FIG. 5.

In some embodiments, media container 220 can include any suitable user interface elements and/or components such as video cards 221-232. In some embodiments, video cards 221-232 can include any suitable information on a recording, presentation, broadcast, and/or other suitable presentation of video content and/or media content. For example, in some embodiments, video cards 221-232 can include thumbnail images, text (e.g., title of the video, user name of the video creator, etc.), tags, emoji, and/or any other suitable content. In some embodiments, video cards 221-232 can be selectable, and can navigate a user to a media player where a video (indicated in the selected video card) can begin playback. In some embodiments, items displayed in media container 220 can be any suitable visual indication of any suitable media content item(s). For example, in some embodiments, media container 220 can display cards associated with a playlist of videos, an album and/or individual songs, photo albums, and/or any other suitable type of media content item. In this example, in some embodiments, any reference to video cards can indicate any suitable media content item.

In some embodiments, video cards 221-232 can include any suitable additional user interface elements and/or components. For example, in some embodiments, video cards 221-232 can include buttons such as "like" and/or "dislike" buttons, additional menu icons and/or indicators (e.g., three horizontal line icon or hamburger icon, three vertical dots icon or kebab icon, etc.) that a user can interact with to navigate additional options for each video card. In some embodiments, the additional user interface elements and/or components on video cards 221-232 can be used to generate a user engagement signal. For example, a user can "like" video card 223 in media container 220 by selecting an appropriate button included in video card 223 (not shown). In some embodiments, a user engagement signal that is based on user interaction with a video card in media container 220 can be included in a request to a server which selects additional video content to display in media container 220.

In some embodiments, media container 220 can be displayed in any suitable region within user interface 200 and can have any suitable number of video cards displayed per row and/or per column. In some embodiments, as shown in FIG. 2, the area of media container 220 can be larger than the visible area of display 210. For example, in some embodiments, video cards 227-232 can be received based on media container 220 and/or user display 200 sending a request for additional video content. Continuing this example, in some embodiments, media container 220 can queue video cards 227-232 for presentation on any suitable display device. That is, in some embodiments, media container 220 can use any suitable mechanisms, such as process 100 as described above in connection with FIG. 1, to sort, organize, append, and/or otherwise determine the presentation order of video cards 227-232 prior to the display of video cards 227-232 on display 210.

In some embodiments, media container 220 can present queued video cards 227-232 based on any suitable mechanism. For example, in some embodiments, media container 220 can present queued video cards 227-229 in display 210 when a user scrolls upwards, which can also remove the presentation of video cards 221-223 from display 210.

Figure 3A:
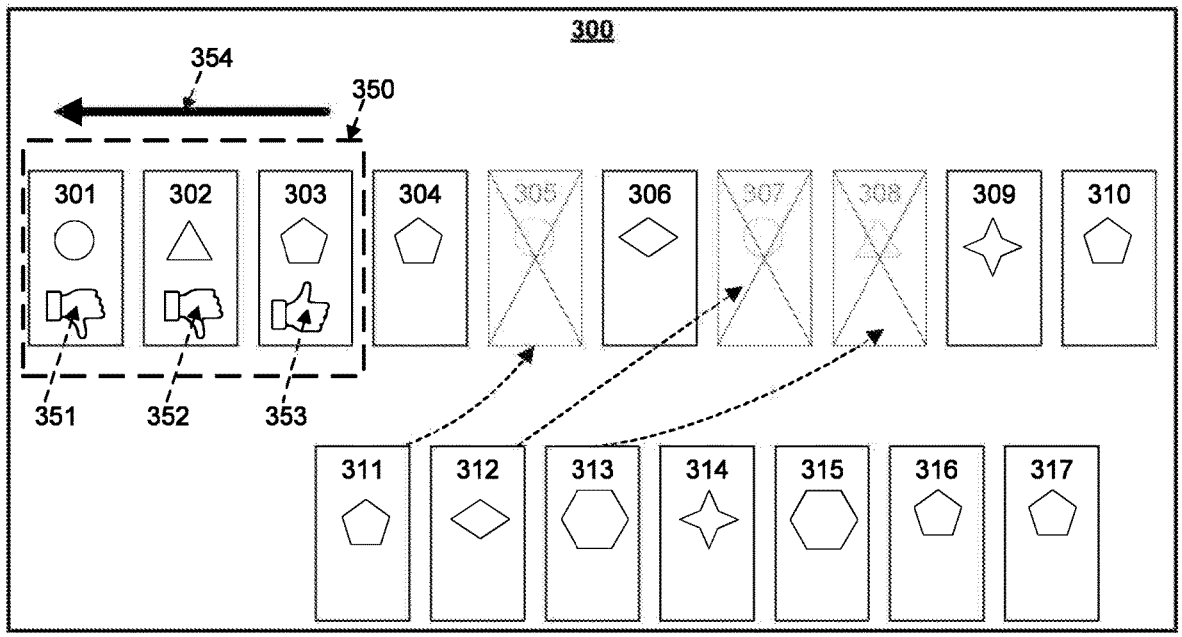
FIGS. 3A-3D show example illustrations of a media content display area presenting recommended media content items based on user navigation signals in accordance with some embodiments of the disclosed subject matter.

Turning to FIG. 3A, an example illustration of a video container 300 with multiple queues in accordance with some embodiments is shown. In some embodiments, video container 300 can be any suitable user interface element such as media container 220 as described above in connection with FIG. 2. In some embodiments, video cards in video container 300 can include any suitable elements, as described above in connection with video cards 221-232.

In some embodiments, video container 300 can have video cards 301-310 arranged and queued for display. For example, in some embodiments, video container can display video cards 301-303 on display 350. Continuing this example, in some embodiments, video cards 304-310 can be queued for display on display 350, but not yet viewed by a user.

In some embodiments, video container 300 can receive video cards 311-317 through any suitable mechanism. In some embodiments, video container 300 can receive video cards 311-317 based on a request made by video container 300 to a server associated with video container 300. In some embodiments, video container 300 can request any suitable number of video cards.

In some embodiments, video container 300 can perform any suitable analysis on video cards 301-317. For example, in some embodiments, video container 300 can identify any suitable properties and/or metadata associated with each video card, such as media content types, title, creator, categorical tag(s), thumbnail image content, and/or any other suitable metadata. For the purposes of illustration, as shown in FIGS. 3A-3D, video cards 301-317 are each displayed with a shape (e.g., circle, triangle, etc.). As shown, in some embodiments, each shape included with video cards 301-317 can indicate a category or type of content included in the particular video card. For example, video card 301 is shown in FIGS. 3A-3D with a circle in some embodiments. In this example, the circle indication can indicate that the content of video card 301 is any suitable subject matter, such as "soccer," in some embodiments. Similarly, in another example, video card 302 is shown in FIGS. 3A-3D with a triangle which can, in some embodiments, indicate that the content of video card 302 is any other suitable subject matter (e.g., that is different from video card 301), such as "cooking." It should be noted that video cards shown with the same shape indication are intended to share the same subject matter. That is, in some embodiments, video cards 305 and 307, which are also shown in FIGS. 3A-3D with a circle, can also contain content that is related to "soccer."

In some embodiments, video container 300 can use any suitable mechanism to determine complementary video card pairs. In some embodiments, complementary videos can be determined based on a similarity score between two particular video cards received in an update. In some embodiments, video container 300 can determine that two video cards have a similarity score below a particular threshold value and/or in a range of values. For example, a cosine similarity calculation can determine that video card 301 and video card 311 have a similarity score of 0.3, which can be below a particular threshold value of 0.5. In this example, in some embodiments, video container 300 can determine that video card 311 are complementary videos and can store the indication in any suitable manner.

In some embodiments, video container 300 can request similarity scores from a server that fulfills requests for more videos from video container 300. In some embodiments, video container 300 can determine, for each possible pairing within video cards 301-317, a similarity score between two video cards. In some embodiments, the similarity scores can be any suitable numeric value. For example, in some embodiments, the similarity score for the pairing of {video card 301, video card 302} can be 0.85, or 85%, which can indicate that video card 301 and video card 302 are more similar than dissimilar. Continuing this example, in some embodiments, video cards 301 and 302 can both contain video demonstrations of scientific concepts (e.g., a demonstration estimating π ("pi"), and a demonstration to measure the speed of light) and can have similar run-times but which are produced by different channels and/or persons. In some embodiments, the similarity scores can be normalized such that all the similarity scores are between zero and one (0 and 1). Note that, in the above example, the subject matter of the videos can be included in determining the similarity score between two videos in some embodiments. In some embodiments, any suitable video attribute, content type, and/or combination of properties (e.g., video resolution, frame rate, aspect ratio, video duration, language spoken in audio, filming location and/or background imagery, etc.) can be used in determining similarity scores between two videos.

In some embodiments, video container 300 can use any suitable mechanism to determine the similarity scores for all possible pairings of video cards 301-317. For example, in some embodiments, video container 300 can input a pair of video cards (e.g., video card 301 and video card 311) into a machine-learning model, and the machine learning model can output a similarity score of 0.3 for the input pair. In some embodiments, any suitable image analysis, audio processing, and/or text processing can be used in determining similarity scores. In some embodiments, video container 300 can determine similarity scores using any suitable property and/or metadata included with the video cards and/or video associated with each video card. In some embodiments, video container 300 can use frames from the videos associated with the video cards to determine a similarity score between two videos. In some embodiments, video container 300 can use a transcript from videos associated with the video cards (e.g., an existing transcript associated with the video and/or a transcript automatically generated from audio tracks within the videos). For example, video container 300 can determine the similarity scores for the pairings of: {video card 301, video card 302}, {video card 301, video card 303}, {video card 301, video card 304}, . . . {video card 302, video card 303}, etc. In this example, video container 300 can determine a total of one hundred and thirty-six (136) similarity scores, as the video container has a set of seventeen (17) video cards and is choosing any two (2) video cards as a sample from the set. In some embodiments, video container 300 can store the determined similarity scores using any suitable mechanism.

In some embodiments, video container 300 can rank received video cards 311-317 using any suitable mechanism. For example, in some embodiments, video container 300 can use user preferences, user engagement signals, and/or any other suitable user information (e.g., age, location, any other suitable demographic information) to rank video cards 311-317 in an order of the user preference for content in each of the video cards 311-317. That is, in some embodiments, video container 300 can arrange video cards 311-317 such that a user is most likely to leave a positive indication of user engagement (e.g., "like," "favorite," etc.) with the first card (e.g., video card 311), and a user is least likely to leave a positive indication of user engagement with the last card (e.g., video card 317).

In some embodiments, video container 300 can receive one or more negative user engagement signals (e.g., "dislike" 351 and 352) from a video card (e.g., video cards 301 and 302) displayed on display 350. In some embodiments, video container 300 can receive one or more positive user engagement signal(s) (e.g., "like" 353) from a video card (e.g., video card 303) displayed on display 350. In some embodiments, video container 300 can determine negative and/or positive user engagement signal(s) that is based on any suitable information, such as a dwell time and/or watch time of video cards 301-303. In some embodiments, video container 300 can use similarity scores to determine the following: (i) video cards 305 and 307 are similar to video card 301, (ii) video card 308 is similar to video card 303, and (iii) video cards 301 and 302 are associated with at least one negative user engagement signal. In another example, in some embodiments, video container 300 can use similarity scores to determine the following: (i) video cards 311, 312, and 313 are similar to video card 303 and (ii) video card 303 is associated with at least one positive user engagement signal.

Figure 3B:
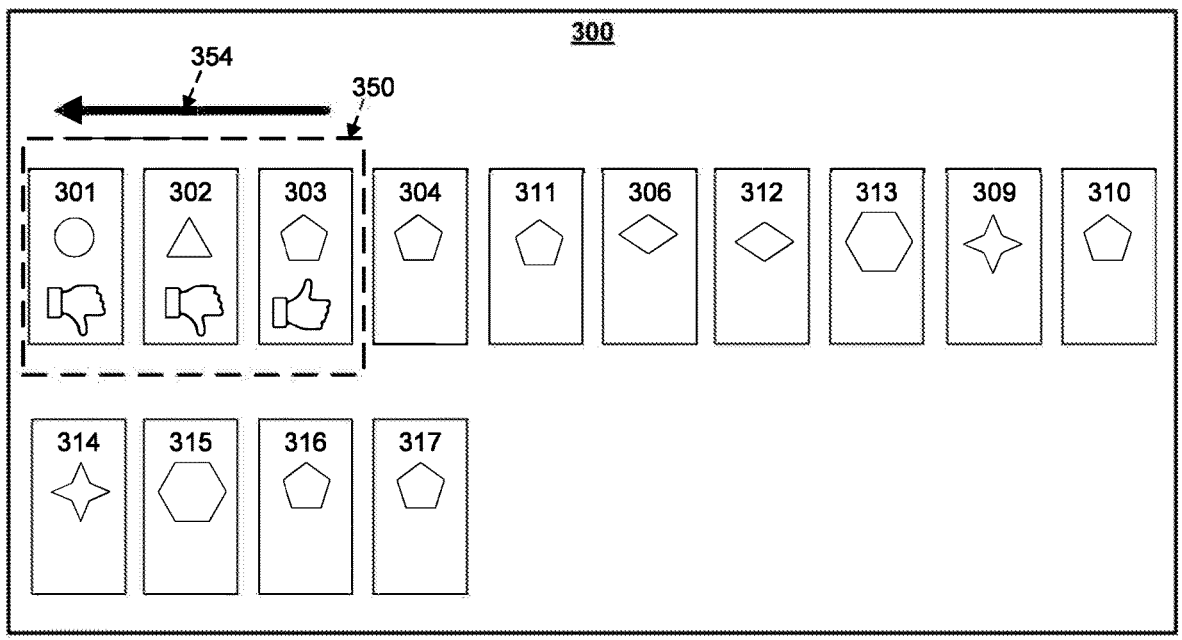

In some embodiments, as shown by navigation arrow 354, a user can navigate video container 300 to view any suitable video cards in video container 300. As shown in FIGS. 3A and 3B, navigation arrow 354 can indicate that a user is navigating video container 300 such that display 350 shows previously viewed video cards (e.g., away from unseen video cards 304-310).

In some embodiments, video container 300 can combine navigation arrow 354 and user engagement signals 351-353 and determine that video cards 305, 307, and 308 can be replaced with video cards 311, 312, and 313, respectively, as shown in FIG. 3A. In some embodiments, video container 300 can additionally determine and/or estimate an amount of time required to replace video cards 305, 307, and 308 with video cards 311, 312, and 313, and can calculate and/or estimate a time point, based on navigation arrow 354, a user is likely to navigate beyond the display of video cards 301-303. For example, it can be determined whether replacement of a queued video can be performed faster than the user can navigate (e.g., based on the navigation direction and the navigation speed) to reach the position of the video for replacement within the queue. In response to determining that the video can be replaced prior to the user navigating to the position within the queue corresponding to that video, video container 300 can cause the corresponding video card to be replaced with another video card, such as a complementary video card in the media update.

In some embodiments, video container 300 can replace video cards 305, 307, and 308 in any suitable order. For example, video container 300 can replace video card 305 with video card 311 prior to replacing video card 307 with video card 312 as video card 307 can be determined as being most likely to be seen first. In another example, video container 300 can replace video card 308 with video card 313 prior to replacing video card 307 with video card 313 as video card 308 can be determined as being least likely to be seen first.

In some embodiments, video container 300 can remove video cards 305, 307, and 308 from the queue such that the user is not able to navigate to the removed video cards. In some embodiments, video container 300 can append the remaining video cards 314-317 to the end of the queue for display, as shown in FIG. 3B.

Figure 3C:
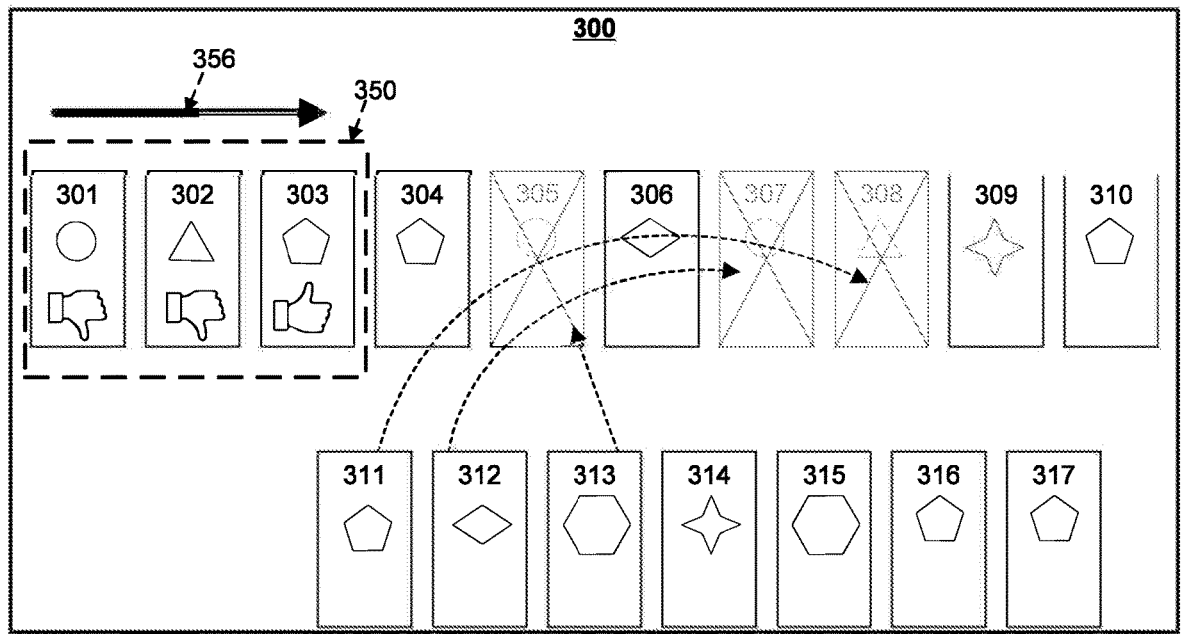
Figure 3D:
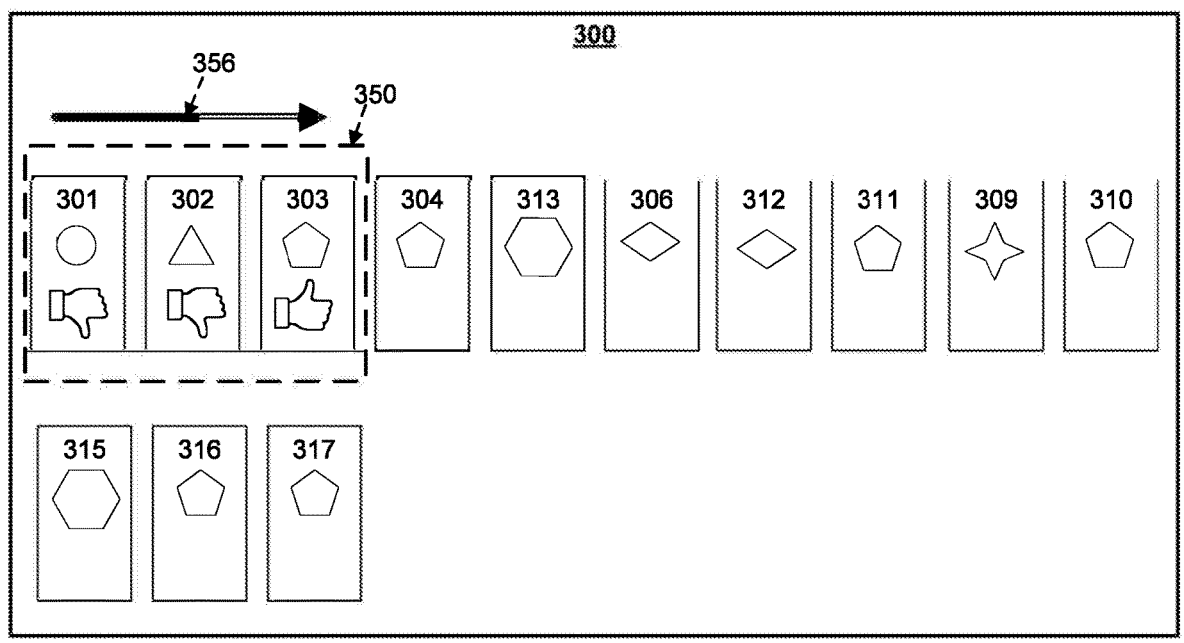

In some embodiments, as shown in FIGS. 3C and 3D, a user can navigate video container 300 to view any suitable video cards in video container 300. As shown in FIGS. 3C and 3D, navigation arrow 356 can indicate that a user is navigating video container 300 such that display 350 can show queued video cards 304-310.

In some embodiments, video container 300 can combine navigation arrow 356 and user engagement signals 351-353 and determine that video cards 305, 307, and 308 can be replaced with video cards 313, 312, and 311, respectively, as shown in FIG. 3C. In some embodiments, video container 300 can additionally determine and/or estimate an amount of time required to replace video cards 305, 307, and 308 with video cards 313, 312, and 311, and can calculate and/or estimate a time point, based on navigation arrow 356, that a user is likely navigate beyond the display of video cards 301-303.

In some embodiments, video container 300 can replace video cards 305, 307, and 308 in any suitable order. For example, video container 300 can replace video card 308 with video card 311 prior to replacing video card 307 with video card 312 as video card 308 can be determined as being least likely to be seen first. In another example, video container 300 can replace video card 305 with video card 313 prior to replacing video card 307 with video card 311 as video card 307 can be determined as being most likely to be seen first.

In some embodiments, video container 300 can remove video cards 305, 307, and 308 from the queue such that the user is not able to navigate to the removed video cards. In some embodiments, video container 300 can append the remaining video cards 314-317 to the end of the queue for display, as shown in FIG. 3D.

Figure 4:
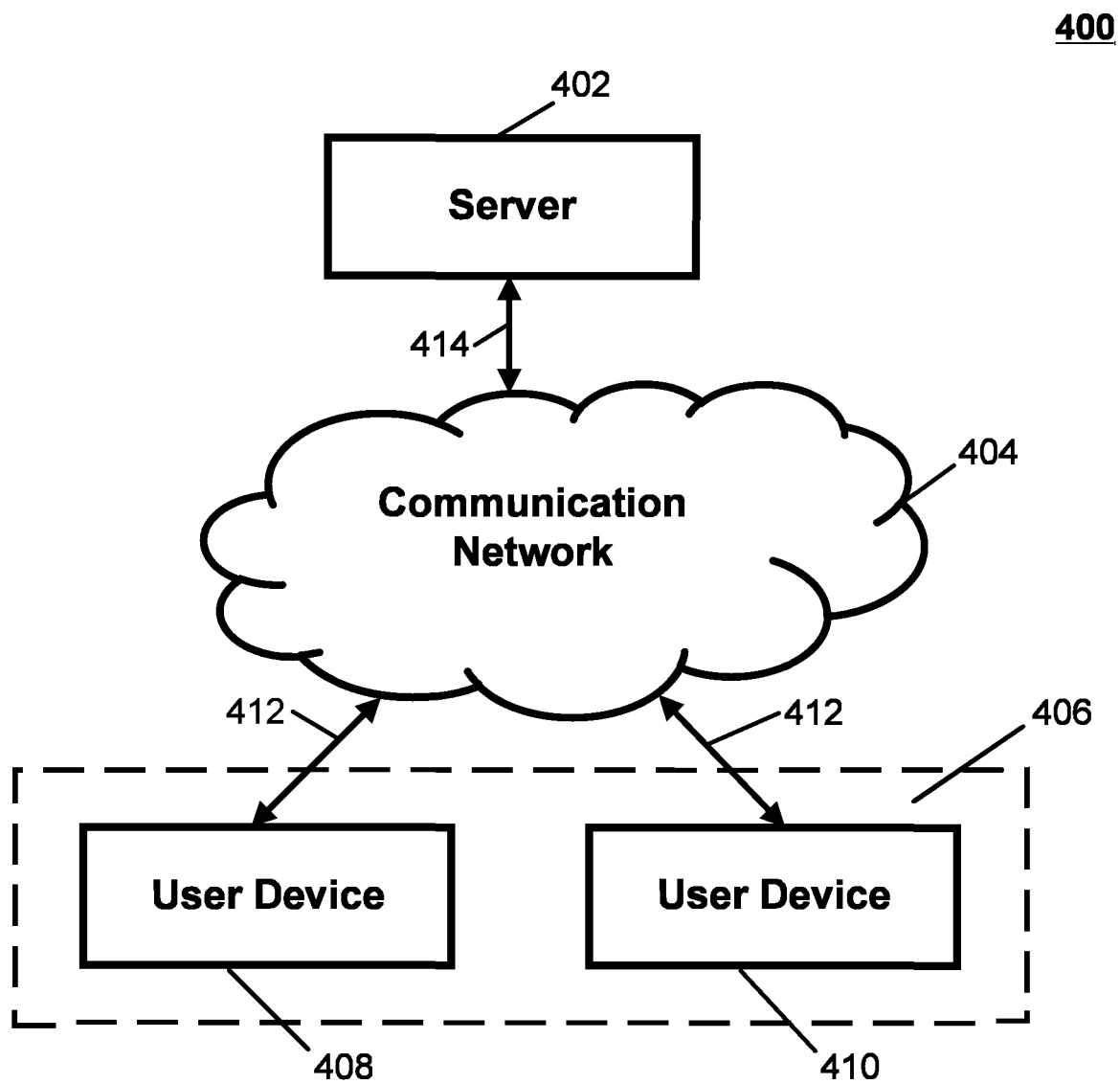
FIG. 4 shows an example block diagram of a system that can be used to implement the mechanisms described herein in accordance with some implementations of the disclosed subject matter.

Turning to FIG. 4, an example 400 of hardware for presenting recommended media content items based on user navigation signals in accordance with some implementations is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some implementations, server 402 can perform any suitable function(s).

Communication network 404 can be any suitable combination of one or more wired and/or wireless networks in some implementations. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for use with process 100. In some implementations, user device 406 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some implementations. For example, in some implementations, multiple devices can be used to implement the functions performed by server 402.

Although two user devices 408 and 410 are shown in FIG. 4 to avoid overcomplicating the figure, any suitable number of user devices, (including only one user device) and/or any suitable types of user devices, can be used in some implementations.

Server 402 and user devices 406 can be implemented using any suitable hardware in some implementations. For example, in some implementations, devices 402 and 406 can be implemented using any suitable general-purpose computer or special-purpose computer and can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 504, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some implementations. In some implementations, hardware processor 502 can be controlled by a computer program stored in memory and/or storage 504. For example, in some implementations, the computer program can cause hardware processor 502 to perform functions described herein.

Memory and/or storage 504 can be any suitable memory and/or storage for storing programs, data, documents, and/or any other suitable information in some implementations. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some implementations. For example, input device controller 506 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some implementations. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some implementations. In some implementations, antenna 516 can be omitted.

Bus 518 can be any suitable mechanism for communicating between two or more components 502, 504, 506, 510, and 514 in some implementations.

Any other suitable components can be included in hardware 500 in accordance with some implementations.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of process 100 can be executed or performed in any order or sequence not limited to the order and sequence shown in and described in connection with FIG. 1. Also, some of the above blocks of process 100 can be executed or performed substantially simultaneously where appropriate or in parallel to reduce latency and processing times. Additionally or alternatively, some of the above described blocks of process 100 can be omitted.

Accordingly, methods, systems, and media for presenting recommended media content items based on user navigation signals are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method comprising:
receiving, by a computing system, an update to a display area within a user interface, the user interface presenting a first subset of a first plurality of media content items in the display area with a second subset of the first plurality of media content items being queued for display and not yet presented in the display area, wherein the update comprises a second plurality of media content items;
determining, by the computing system, a similarity score between at least one of the first plurality of media content items and at least one of the second plurality of media content items, wherein similar media content items in the first plurality of media content items and the second plurality of media content items have a similarity score within a range of similarity values;
determining, by the computing system, a user engagement signal based on one or more user navigation actions corresponding to a first media content item from the first subset of the first plurality of media content items;
replacing, by the computing system, a second media content item from the second subset of the first plurality of media content items with a third media content item from the second plurality of media content items at a position of the second media content item in a presentation order for the first plurality of media content items, wherein the second media content item is selected based on the user engagement signal and the similarity score between the first media content item and the second media content item; and
causing, by the computing system, the subset of the first plurality of second media content items to be presented in the display area with the third media content item being presented instead of the second media content item at the position in the presentation order for the first plurality of media content items.

2. The method of claim 1, wherein determining the presentation order for the second plurality of media content items further comprises determining, by the computing system and using a cosine similarity calculation, the similarity score between the at least one of the first plurality of media content items and the at least one of the second plurality of media content items.

3. The method of claim 1, wherein determining the presentation order for the second plurality of media content items further comprises determining, by the computing system, a potential user engagement value for each media content item in the second plurality of media content items.

4. The method of claim 1, wherein the user engagement signal based on the one or more user navigation actions from the display area of the user interface comprises the user browsing media content items previously displayed in the display area by navigating the display area.

5. The method of claim 1, wherein the user engagement signal based on the one or more user navigation actions from the display area of the user interface comprises the user browsing media content items from the second subset of the first plurality of media content items queued for display.

6. The method of claim 1, wherein the user engagement signal comprises a positive indication of user interaction with a particular media content item, and wherein the first media content item is selected based on determining that the particular media content item and the first media content item have a similarity below a threshold value.

7. The method of claim 1, wherein the user engagement signal comprises a negative indication of user interaction with a particular media content item, and wherein the first media content item is selected based on determining that the particular media content item and the first media content item have a similarity score above a threshold value.

8. The method of claim 1, wherein the first plurality of media content items and the second plurality of media content items are a same content type, and wherein the same content type is video content.

9. A system comprising:
a memory; and
a hardware processor that is configured to:
receive an update to a display area within a user interface, the user interface presenting a first subset of a first plurality of media content items in the display area with a second subset of the first plurality of media content items being queued for display and not yet presented in the display area, wherein the update comprises a second plurality of media content items;
determine a similarity score between at least one of the first plurality of media content items and at least one of the second plurality of media content items, wherein similar media content items in the first plurality of media content items and the second plurality of media content items have a similarity score within a range of similarity values;
determine a user engagement signal based on one or more user navigation actions corresponding to a first media content item from the first subset of the first plurality of media content items;

replace a second media content item from the second subset of the first plurality of media content items with a third media content item from the second plurality of media content items at a position of the second media content item in a presentation order for the first plurality of media content items, wherein the second media content item is selected based on the user engagement signal and the similarity score between the first media content item and the second media content item; and cause the second subset of the first plurality of media content items to be presented in the display area with the third media content item being presented instead of the second media content item at the position in the presentation order for the first plurality of media content items.

10. The system of claim 9, wherein to determine the presentation order for the second plurality of media content items the hardware processor is configured to determine, using a cosine similarity calculation, the similarity score between the at least one of the first plurality of media content items and the at least one of the second plurality of media content items.

11. The system of claim 9, wherein to determine the presentation order for the second plurality of media content items the hardware processor is configured to determine a potential user engagement value for each media content item in the second plurality of media content items.

12. The system of claim 9, wherein the user engagement signal based on the one or more user navigation actions from the display area of the user interface comprises the user browsing media content items previously displayed in the display area by navigating the display area.

13. The system of claim 9, wherein the user engagement signal based on the one or more user navigation actions from the display area of the user interface comprises the user browsing media content items from the second subset of the first plurality of media content items queued for display.

14. The system of claim 9, wherein the user engagement signal comprises a positive indication of user interaction with a particular media content item, and wherein the first media content item is selected based on determining that the particular media content item and the first media content item have a similarity below a threshold value.

15. The system of claim 9, wherein the user engagement signal comprises a negative indication of user interaction with a particular media content item, and wherein the first media content item is selected based on determining that the particular media content item and the first media content item have a similarity score above a threshold value.

16. A non-transitory computer-readable medium containing computer executable instructions that, when executed by a processor, cause the processor to:

receive an update to a display area within a user interface, the user interface presenting a first subset of a first plurality of media content items in the display area with a second subset of the first plurality of media content items being queued for display and not yet presented in the display area, wherein the update comprises a second plurality of media content items;

determine a similarity score between at least one of the first plurality of media content items and at least one of the second plurality of media content items, wherein similar media content items in the first plurality of media content items and the second plurality of media content items have a similarity score within a range of similarity values;

determine a user engagement signal based on one or more user navigation actions corresponding to a first media content item from the first subset of the first plurality of media content items;

replace a second media content item from the second subset of the first plurality of media content items with a third media content item from the second plurality of media content items according to a position of the second media content item at a presentation order for the first plurality of media content items, wherein the second media content item is selected based on the user engagement signal and the similarity score between the first media content item and the second media content item; and cause the second subset of the first plurality of media content items to be presented in the display area with the third media content item being presented instead of the second media content item at the position in the presentation order for the first plurality of media content items.

17. The non-transitory computer-readable medium of claim 16, wherein to determine the presentation order for the second plurality of media content items the instructions, when executed by the processor, cause the processor to determine, using a cosine similarity calculation, the similarity score between the at least one of the first plurality of media content items and the at least one of the second plurality of media content items.

18. The non-transitory computer-readable medium of claim 16, wherein to determine the presentation order for the second plurality of media content items the instructions, when executed by the processor, cause the processor to determine a potential user engagement value for each media content item in the second plurality of media content items.

19. The non-transitory computer-readable medium of claim 16, wherein the user engagement signal based on the one or more user navigation actions from the display area of the user interface comprises the user browsing media content items previously displayed in the display area by navigating the display area.

20. The non-transitory computer-readable medium of claim 16, wherein the user engagement signal based on the one or more user navigation actions from the display area of the user interface comprises the user browsing media content items from the second subset of the first plurality of media content items queued for display.

21. The non-transitory computer-readable medium of claim 16, wherein the user engagement signal comprises a positive indication of user interaction with a particular media content item, and wherein the first media content item is selected based on determining that the particular media content item and the first media content item have a similarity below a threshold value.

* * * * *